United States Patent [19]
Kim

[11] Patent Number: 6,046,630
[45] Date of Patent: Apr. 4, 2000

[54] π/4 QPSK DIGITAL DEMODULATING APPARATUS AND A METHOD THEREOF

[75] Inventor: Jae-Wan Kim, Seoul, Rep. of Korea

[73] Assignee: Hyundai Electronics Industries Co., Ltd., Kyonggi-Do, Rep. of Korea

[21] Appl. No.: 09/099,606

[22] Filed: Jun. 18, 1998

[30] Foreign Application Priority Data

Jun. 27, 1997 [KR] Rep. of Korea ................. 97-28296
Jun. 27, 1997 [KR] Rep. of Korea ................. 97-28297

[51] Int. Cl.$^7$ .................................................. H03D 3/00
[52] U.S. Cl. ...................................... 329/304; 329/336
[58] Field of Search ................................ 329/304, 336, 329/308, 309, 310, 306; 375/324, 329, 331, 328, 340

[56] References Cited

U.S. PATENT DOCUMENTS

| | | | |
|---|---|---|---|
| 5,007,068 | 4/1991 | Simon et al. | 375/53 |
| 5,490,176 | 2/1996 | Peltier | 375/325 |
| 5,539,355 | 7/1996 | Nakamura | 329/302 |
| 5,905,405 | 5/1999 | Ishizawa | 329/308 |

*Primary Examiner*—Benny Lee
*Assistant Examiner*—Henry Choe

*Attorney, Agent, or Firm*—McAulay Nissen Goldberg Kiel & Hand, LLP

[57] ABSTRACT

In a digital demodulation apparatus of a QPSK receiver which demodulates an input signal being modulated in the QPSK method by separating into an I (In Phase) channel signal and a Q (Quadrature) channel signal by a local carrier which is synchronized with the transmitter, A π/4 QPSK digital modulation apparatus includes a bandpass filter part to remove unnecessary signals from input QPSK modulated signals, a channel separation part for mixing the modulated signals input from the bandpass filter and a one-symbol delayed modulated previous signal to separate a Q channel signal and an I channel signal, a first low-pass filter part and a second low-pass filter part for cutting off carrier component from the Q and I channel signals which are separated by the channel separation part to derive baseband signals of orthogonal component and cophase component, a first data recovery part and a second data recovery part respectively for sampling the baseband signals of the Q and I channels respectively input from the first and the second low-pass filter parts to decide and recover the data, a parallel/serial conversion part for converting the two recovered data into serial data, and an error correction part for obtaining phase differences on the basis of the converted serial data and previous data and operating the phase differences with predetermined module values, thereby providing data of which error is recovered.

27 Claims, 8 Drawing Sheets

π/4 QPSK DIGITAL DEMODULATING APPARATUS AND A METHOD THEREOF

BACKGROUND OF THE INVENTION

1. Field of the Invention

The present invention relates to a digital demodulator of a wireless mobile system of a code division multiple connection system and, in more particularly to, a π/4 quadrature phase shift keying (QPSK) digital demodulation apparatus and a method thereof, in which error data of modulated signals may be stably corrected and recovered by a π/4 QPSK without any additional error correction circuits.

2. Description of the Conventional Art

Recently, there is a tendency that the necessity of mobile communication system service is increasing rapidly. Therefore, in order to realize the mobile communication service to a plurality of subscribers, a modulation system having high spectrum efficiency is required so that it becomes essential to develop techniques to utilize frequency efficiency such as the spectrum efficiency and error correction encoding/decoding by using high efficiency of digital modulation/demodulation.

In order to realize the mobile communication service worldwide, group special groups are decided by digital cellular standards in Europe and Telecommunication Industry Association (TIA) is adopted as a standard of a land mobile system in the United States.

As the digital mobile modulation/demodulation method, Gaussian-prefiltered Minimum Shift Keying method of Europe and π/4 shift QPSK method of the United States and Japan are typical.

Generally, smaller bandwidths are transmitted by a linear modulation transmit rather than by a constant envelope modulation such as the quadrature amplitude shift keying (QMSK) and Tamed Frequency Modulation (TFM). However, the constant envelope modulation may adopt a nonlinear amplifier which has higher power efficiency even though its precision for amplitudes is not good since modulated signals of the constant envelope modulation include any information in their amplitudes.

On the other hand, the linear modulation adopts a linear amplifier which is good for keeping signal waveforms precisely while modulating signal amplitudes. Under the circumstances, π/4 QPSK shift QPSK has been proposed for the digital cellular mobile communications.

In general, the digital communication system is subject to coherent detection in order to use bandwidth and the power efficiently.

Even though synchronization system has good power efficiency for white Gaussian noise theoretically, synchronization efficiency decreases when phase noise exists in case of multipath fading or doppler shift, especially in a narrow-band mobile communication system.

An asynchronous system of differential detection is properly used for the narrowband mobile communication system since carrier recovery is not necessary in this system. On the other hand, the linear modulation such as the QPSK has better bandwidth efficiency comparing with the constant envelope modulation such as the QMSK or the TEM.

Even though the digital communication system adopts the nonlinear amplifier for its power efficiency, if a linear modulated carrier is passed through this nonlinear amplifier to increase the power efficiency, it has disadvantages that spectrum is spread and cophase components and orthogonal components are degraded so that serious interface is caused between adjacent channels. Therefore, it becomes impossible to use the spectrum and bit error rate (BER) characteristics decrease due to the nonlinear amplifier.

In order to solve these problems of the nonlinear modulation, offset QPSK (OQPSK) has been proposed to reduce the change of carrier. However, the OQPSK modulation method requires the coherent detection which has low bit error rate (BER) characteristics in the mobile communication channels.

The constant envelope modulation such as the minimum shift keying (MSK), QMSK or TEM may use the nonlinear amplifier without the spectrum dispersion and the differential detection but has still problem that the spectrum efficiency is low.

Therefore, in order to resolve the above disadvantages, π/4 QPSK shift QPSK has been proposed as a linear modulation method which may utilize the nonlinear amplifier and keep the power efficiency and bandwidth efficiency high.

The π/4 QPSK shift QPSK modulation method is limited to ±π/4 and ±3π/4 in the phase change and not subject to 55 change so that the amplitude change decreases. Further, this π/4 QPSK shift QPSK modulation method may use both the coherent detection and differential detection so that the bandwidth efficiency is very excellent.

Now, the conventional π/4 QPSK shift QPSK modulation apparatus is explained with reference to FIG. 1. In FIG. 1, the π/4 QPSK shift QPSK modulation apparatus includes a serial/parallel conversion part 101 to separate data serial input data from an input terminal 100 into orthogonal component data SQ and cophase component data SI to output them parallel, an automatic differential encoding part 102 to obtain a phase shift keying amount ΔQK from the orthogonal component data and the cophase component data which are separately input from the serial/parallel conversion part 101, signal mapping part 103 to output a baseband signal Q(t) of orthogonal component and a baseband signal I(t) of cophase component for time on the basis of the phase shift keying amount and an immediately previous signal, a first low-pass filter part 104 and a second low-pass filter part 105 for respectively passing through the baseband signal Q(t) of orthogonal component and the baseband signal I(t) of cophase component, a first conversion part 107 and a second conversion part 109 to modulate with high frequency signals the baseband signal Q(t) of orthogonal component and the baseband signal I(t) of cophase component which are respectively filtered through the low-pass filter part 104 and 105 and input from input terminals 106 and 108, and a synthesis part 110 to synthesize the modulated output signal from the first and second conversion parts 107 and 109 for providing them to an antenna ANT.

In the conventional modulation apparatus as described above, input serial data SI from the input terminal 100 are divided into the cophase component data SQ and the orthogonal component data SQ through the serial/parallel conversion part 101 and provided to the differential encoding part 102.

The differential encoding part 102 encodes the cophase component data SQ and the orthogonal component data SQ to obtain a phase shift keying amount ΔQK from the phase of the immediately previous signal by Gray Codes and provides the obtained phase shift keying amount ΔQK to the signal mapping part 103.

The signal mapping part 103 operates the phase shift keying amount a ΔQK obtained by the differential encoding part 102 and the immediately previous signal to output unfiltered baseband non-return-to zero signals I(t) and Q(t) which respectively show the cophase component and the orthogonal component.

The baseband signals of the cophase component I(t) and the orthogonal component Q(t) are respectively filtered by the first and the second low-pass filter parts 104 and 105 to be output to the first and the second conversion parts 107 and 109.

Then, the first conversion part 107 mixes the baseband signals of the cophase component I(t) with a cophase signal cos $\omega_o t$ which is input from the input terminal 106 to output it to the synthesization part 110 while the second conversion part 109 mixes the orthogonal component Q(t) with an orthogonal signal $-\sin \omega_o t$ which is input from the input terminal 108 to output it to the synthesization part 110.

Therefore, the synthesization part 110 synthesizes the values modulated by the first and the second conversion parts 107 and 109 to transmit the synthesized values through the antenna ANT.

As described hereinabove, the $\pi/4$ QPSK shift QPSK modulation apparatus transmits information being included in the phase difference of two continuous channel signals. Therefore, a receiver should detect the phase difference in order to derive the information.

Now, a conventional $\pi/4$ QPSK demodulation apparatus for detecting the phase difference will be described with reference to FIG. 2.

In FIG. 2, the conventional $\pi/4$ QPSK demodulation apparatus includes a reception filter part 201 to remove unnecessary signals from a QPSK signal which is input from a receiving input terminal 200, a local oscillation part 203 for generating a local carrier signal, a first phase shift keying part 204 to transit a phase of the local oscillated carrier signal input from the local oscillation part 203 by $\pi/2$ phase, a first mix part 202 to mix the shifted local carrier signal output from the first phase shift keying part 204 with the modulated signal output from the reception filter part 201, a second mix part 205 to mix the local carrier signal output from the local oscillation part 203 with the modulated signal output from the reception filter part 201, a third low-pass filter part 206 to block carrier component from the signal mixed by the first mix part 202 for deriving a baseband signal of orthogonal component, a fourth low-pass filter part 207 to block carrier component from the signal mixed by the second mix part 205 for deriving baseband signal of cophase component I, a carrier recovery part 220 having third and fourth mix parts 210 and 211 and a loop filtering part 209 to control outputs from the local oscillation part 203 on the basis of phase synchronization of a carrier of a transmitter which is received by the receiver, a clock recovery part 208 to recover a symbol rate clock of the transmitter which is input through the reception filter part 201, a second phase shift keying part 212 to transit a phase of the clock recovered by the clock recovery part 208 by $\pi/2$ phase to provide to the third mix part 210 of the carrier recovery part 220, a third phase shift keying part 215 to transit a phase of the clock recovered by the clock recovery part 208 by $\pi$ phase, a second decision part 214 to obtain a phase difference between the clock which is recovered by the clock recovery part 208 and the baseband signal of cophase component I which is derived by the fourth low-pass filter part 207, a first decision part 213 to obtain a phase difference between the phase which is transited by the third phase shift keying part 215 and the baseband signal of orthogonal component which is derived by the third low-pass filter part 206, a first adder 216 to add the phase of cophase component and the phase of orthogonal component which are respectively obtained by the first and the second decision parts 213 and 214, and a second adder 217 to add the signal added by the first adder 216 and the clock which is recovered by the clock recovery part 208, wherein the loop filtering part 209, the third mix part 210, and the fourth mix parts 211 compose the single carrier recovery part 220.

In the conventional demodulation apparatus as described above, when the QPSK modulation signal is input to the reception filter part 201 from the receiving input terminal 200, the reception filter part 201 removes unnecessary signals from the input modulated signal to output to the first and the second mix parts 202 and 205.

The first and the second mix parts 202 and 205 multiply the output from the reception filter part 201 with a synchronized local carrier. In more detail, when the local carrier signal which is oscillated by the local oscillation part 203 is input to the second mix part 205 and the local carrier signal of which phase is shifted by $\pi/2$ by the first phase shift keying part 204 is input to the first mix part 202, the first mix part 202 mixes the phase shifted local carrier signal and the modulated signal which is input from the reception filter part 201 to derive a signal of orthogonal component.

On the other hand, the second mix part 205 mixes the local carrier signal with the input modulated signal to derive a signal of cophase component. Therefore, the derived orthogonal component signal and the cophase component signal are respectively output to the third and the fourth low-pass filter parts 206 and 207.

The third and the fourth low-pass filter parts 206 and 207 cut off the carrier components of the first and the second mix parts 202 and 205 and derive only the orthogonal component and the cophase component, that is, the baseband signals of Q (quadrature) and I (In phase) channels to send them to the below-mentioned fourth mix part 211 and the first and the second decision parts 213 and 214 of the carrier recovery part 220.

Since the symbol rate clock which is used at the transmitter has a certain error, the clock recovery part 208 recovers this error and provides the recovered clock to the second and the third phase shift keying part 212 and 215, and the second decision part 214.

The second phase shift keying part 212 performs $\pi/2$ phase shifting of the input clock which is recovered by the clock recovery part 208 to output to the third mix part 210, while the third phase shift keying part 215 performs $\pi$ phase shifting of the input clock which is recovered by the clock recovery part 208 to output to the first decision part 213. Wherein the fourth mix part 211 mixes the baseband signals of the Q and I channels which are respectively derived by the third and the fourth filter parts 206 and 207 to output to the third mix part 210.

Therefore, the third mix part 210 mixes the output from the fourth mix part 211 with the output from the second phase shift keying part 212 to recover the carrier signal. That is, in a phase synchronized receiver, the frequency and the phase of the local carrier being in use at the receiver have to be synchronized with the frequency and the phase of the carrier being in use at the transmitter.

In order to realize the synchronization, the receiver includes the carrier recovery part 220 having the third and the fourth mix parts 210 and 211 and the loop filter part 209 to recover the frequency and phase of the carrier from the input high frequency signal by using the phase-locked loop (PLL).

On the other hand, the first decision part 213 obtains a phase difference between the phase which is shifted by the third phase shift keying part 215 and the baseband signal of Q channel which is derived by the third low-pass filter 206 to output to the first adder 216, while the second decision part 214 obtains a phase difference between the clock which is recovered by the clock recovery part 208 and the baseband signal of I channel which is derived by the fourth low-pass filter 207 to output to the first adder 216.

Therefore, the first adder 216 adds the orthogonal component phase and the cophase component phase which are respectively obtained by the first and the second decision parts 213 and 214, while the second adder 217 adds the signal which is added by the first adder 216 and the clock of the clock recovery part 208 to output a QPSK modulated signal.

However, the conventional π/4 QPSK demodulation apparatus has still disadvantages that its construction is much complicated since the clock recovery part must be provided to recover the erroneous symbol rate clock which is used by the transmitter and the clock recovery part essentially requires the phase-locked loop (PLL). The construction of the conventional π/4 QPSK demodulation apparatus is further complicated since an error correction circuit using Hamming Code and Bose-Chaudhuri-Hocquenghem Code (BCH code) must be provided additionally to correct the errors of the modulated signals.

Therefore, hardwares for realizing the phase-locked loop circuit and the error correction circuit are much complicated, resulting in the difficulties of mass production as well as of minimization of the products.

SUMMARY OF THE INVENTION

The present invention is derived to resolve the disadvantages of the conventional techniques and it is an object of the present invention to provide a π/4 QPSK digital demodulation apparatus and a method thereof, wherein one or more error data may be corrected by differential detection without additional phase-locked loop circuit and error correction circuit.

It is another object of the present invention to provide a π/4 QPSK digital demodulation apparatus and a method thereof wherein one or more error data may be corrected by utilizing parity characteristics with differential detection of simple circuit arrangement which is stable and strong against fading phenomenon.

It is a further object of the present invention to simplify circuit arrangement of a demodulation apparatus by connecting one or two error correction circuits to an end part of a differential detector of a π/4 QPSK digital demodulation apparatus.

In order to achieve the above objects of the present invention, a π/4 QPSK digital modulation method of a digital demodulation apparatus of a QPSK receiver which demodulates an input signal being modulated in QPSK method by separating into an I (In Phase) channel signal and a Q (Quadrature) channel signal by a local carrier which is synchronized with the transmitter, includes the steps of mixing the input modulated signal with a symbol-delayed reference signal to derive phase information of the I channel signal and the Q channel signal, recovering data by sampling the phase information of the derived I channel and the Q channel, converting the recovered I and Q channel data to serial data to recover parity data and basic data on the basis of the converted serial data and previous data which is delayed by a first predetermined symbol unit, and correcting errors of the recovered basic information data and the parity data by a predetermined modular operation.

According to the π/4 QPSK digital demodulation method according to the present invention, the data recovering step includes the sub-steps of comparing the converted serial data with previous data which is one symbol-delayed, and comparing the converted serial data with previous data which is two symbol-delayed.

According to the π/4 QPSK digital demodulation method according to the present invention, the error correcting step includes the sub-steps of recovering parity data having correlation between data on the basis of data which are respectively delayed by units of a second symbol and a third symbol, delaying the recovered basic information data and the parity data by units of symbols to decide a delayed value, and modular operating the decided threshold error value to correct data error.

Preferably, the first predetermined symbol is to be one-symbol and the second and third predetermined symbols are respectively two-symbol and six-symbol.

According to another aspect of the present invention, there is provided a π/4 QPSK digital demodulation apparatus wherein an input signal of which digital data is modulated by QPSK is separated into I and Q channel signals by a local carrier which is synchronized with a transmitter and the separated I and Q channel signals respectively pass through low-pass filters for being converted to digital signals to be demodulated, includes a bandpass filter part to remove unnecessary signals from input QPSK modulated signals, a channel separation part for mixing the modulated signals input from the bandpass filter and a one-symbol delayed modulated previous signal to separate a Q channel signal and an I channel signal, a first low-pass filter part and a second low-pass filter part for cutting off carrier components from the Q and I channel signals which are separated by the channel separation part to derive baseband signals of orthogonal component and cophase component, a first data recovery part and a second data recovery part respectively for sampling the baseband signals of the Q and I channels which are respectively input from the first and the second low-pass filter parts to decide and recover the data, a parallel/serial conversion part for converting the two recovered data into serial data, and an error correction part for obtaining phase differences on the basis of the converted serial data and previous data to operate the phase differences with predetermined module values, thereby providing data of which error is recovered.

According to the π/4 QPSK digital demodulation apparatus of the present invention, the channel separation part includes a first symbol delay for delaying the modulated signal which is input from the bandpass filter by one symbol, a first mix part for mixing the one-symbol delayed signal and the modulated signal of the bandpass filter to derive a signal of Q channel, a phase shift keying part for shifting the one-symbol delayed signal by π/2 phase, and a second mix part for mixing the modulated signal of which phase is shifted by the phase shift keying part and the modulated signal of the bandpass filter to derive a signal of I channel.

The first data recovery part includes a first sampling part for sampling the baseband signal of the Q channel which is filtered by the first low-pass filter and a first decision part for deciding the sampled data, while the second data recovery part includes a second sampling part for sampling the baseband signal of the I channel which is filtered by the second low-pass filter and a second decision part for deciding the sampled data.

The error correction part includes a first phase information detection part for obtaining a phase difference on the basis of the output data from the parallel/serial conversion part and one-symbol delayed previous data, a second phase information detection part for obtaining a phase difference on the basis of a current output data from the parallel/serial conversion part and two-symbol delayed data, a first operation part for operating with a predetermined module value current phase information and the phase information obtained by the first phase information detection part after delaying by a predetermined symbol so as to recover basic data, a second operation part for sequentially operating the phase information obtained by the second phase information detection part and the operation value of the first operation part with a predetermined module value to recover parity data, and a data recovery output part for correcting error on the basis of the data which is recovered by the first and the second operation parts.

There is another embodiment of the present invention, wherein the error correction part includes a third phase information detection part for obtaining phase difference information on the basis of the output data from the parallel/serial conversion part and previous data delayed with a first symbol, a fourth phase information detection part for obtaining phase difference information on the basis of a current output data from the parallel/serial conversion part and previous data delayed with a second symbol, a fifth phase information detection part for obtaining a phase difference information on the basis of a current output data from the parallel/serial conversion part and previous data delayed with a third symbol, a third operation part for operating current phase information obtained by the fifth phase information detection part and the phase information obtained by the fourth phase information detection part after delaying by a predetermined symbol so as to recover parity data, and a majority-logic decoder for sequentially operating the operation value of the third operating part and the phase information obtained by the third phase information detection part after delaying this by steps with a predetermined module value to decide a threshold value of an error, thereby providing data of which errors are recovered.

The majority-logic decoder includes a delay part for delaying the phase difference information obtained by the third phase information detection part by 5-symbol, a fourth operation part for operating phase difference information respectively delayed by 3-symbol, 4-symbol, and 5-symbol and current phase difference information obtained by the third phase information detection part with 8 module values to detect an error, a fifth operation part for sequentially operating the error value obtained by the fourth operation part and a feedback error value with 8 module values to output after delaying it by 2-symbol, a sixth operation part for operating the previous error value which is delayed 2-symbol by the fifth operation part and a feedback error value with 8 module values to output after delaying, a threshold value decision part for deciding threshold values of the error value obtained by the fifth and the sixth operation parts and the error value input from the fourth operation part to feedback output the threshold values to the fifth and the sixth operation parts, and a demodulation data output part for operating the error values decided by the threshold value decision part and the phase difference information obtained by the delay part with 8 module values to output demodulated data.

BRIEF DESCRIPTION OF THE DRAWINGS

The present invention will become more fully understood from the detailed description given hereinbelow accompanying drawings which are given by way of illustration only, and thus are not limitative of the present invention, and wherein.

DETAILED DESCRIPTION OF THE INVENTION

The π/4 QPSK digital demodulation apparatus according to the present invention will now be explained with reference to the accompanying drawings.

Figure 1:
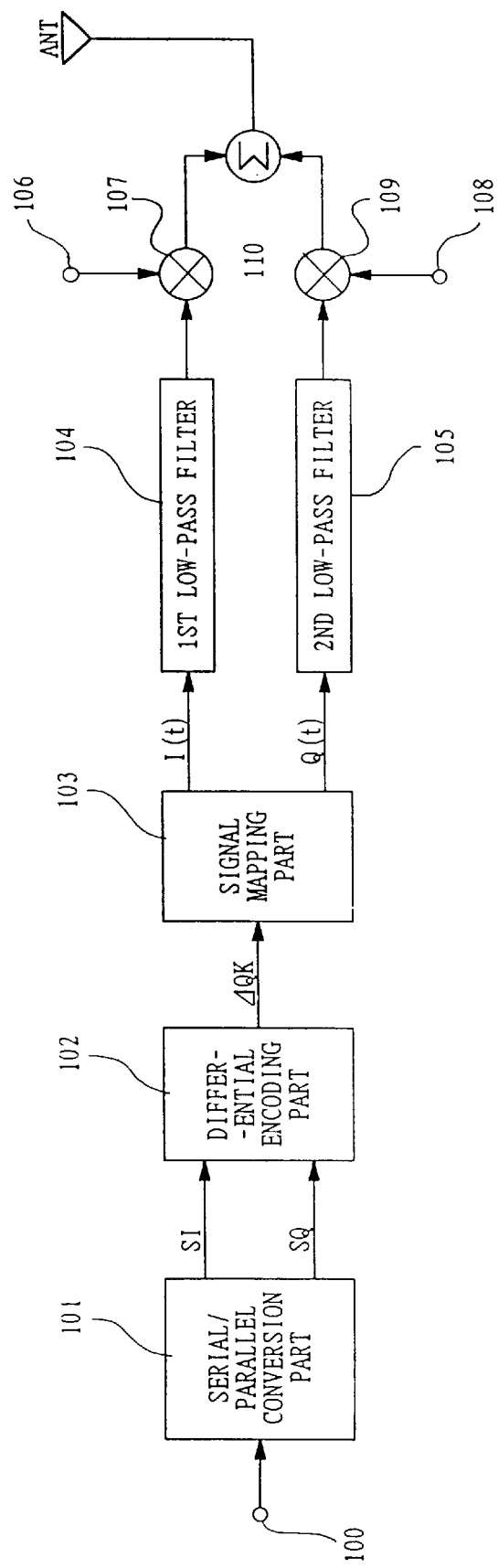
FIG. 1 is a schematic block diagram showing a conventional π/4 QPSK modulation apparatus.
Figure 2:
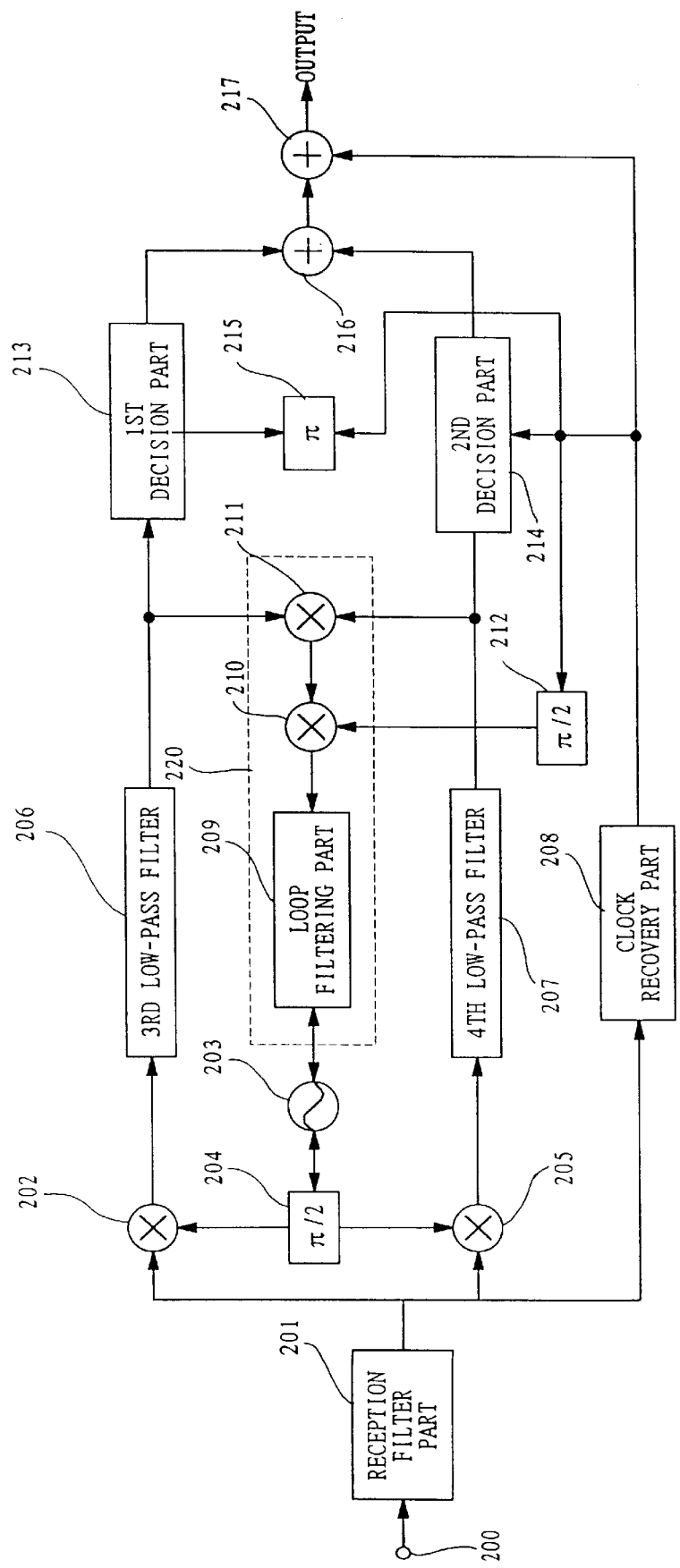
FIG. 2 is a schematic block diagram showing a conventional π/4 QPSK demodulation apparatus.
Figure 3:
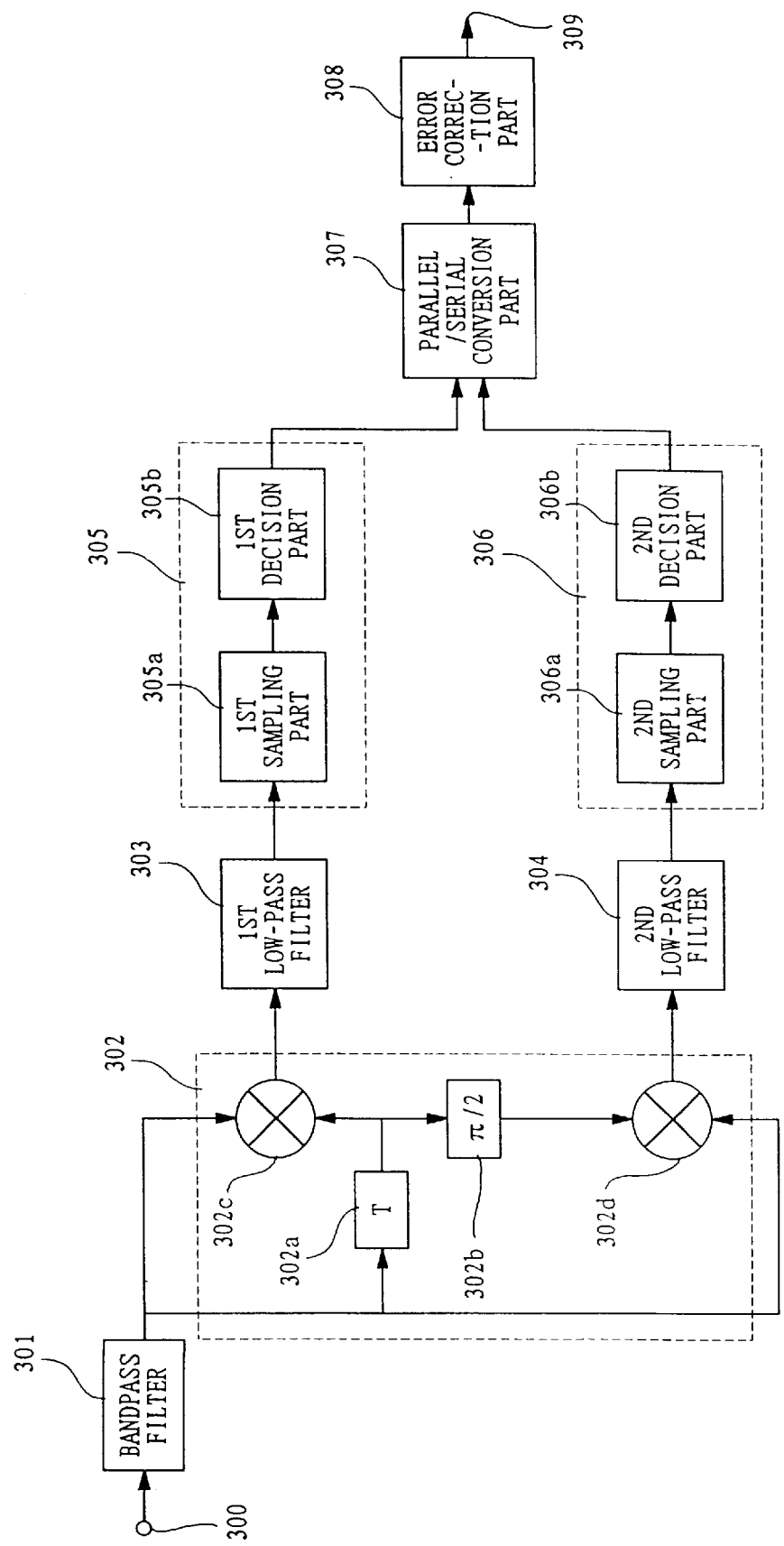
FIG. 3 is a schematic block diagram showing a π/4 QPSK demodulation apparatus according to a preferred embodiment of the present invention.

FIG. 3 illustrates a block diagram showing a construction of π/4 QPSK digital demodulation apparatus according to the present invention.

In FIG. 3, the π/4 QPSK digital demodulation apparatus includes a bandpass filter part 301 to remove unnecessary signals from QPSK modulated signals which are input from a receiving input terminal 300, a channel separation part 302 for mixing the modulated signals input from the bandpass filter 301 and a one-symbol delayed previous modulated signal to separate a Q channel signal and an I channel signal, a first low-pass filter part 303 and a second low-pass filter part 304 for cutting off carrier component from the Q and I channel signals which are separated by the channel separation part 302 to derive baseband signals of orthogonal component and cophase component, a first data recovery part 305 and a second data recovery part 306 respectively for sampling by a first sampling part 305a and a second sampling part 306a the baseband signals of the Q and I channels respectively input from the first and the second low-pass filter parts 303 and 304 to decide and recover the data by a first decision part 305b and a second decision part 306b, a parallel/serial conversion part 307 for converting the two recovered data into serial data, and an error correction part 308 for obtaining two or three phase difference informations on the basis of a current converted serial data and previous data and operating the obtained phase differences by delaying to decide a threshold value of an error value, thereby providing data of which two or three errors are recovered through an output terminal 309.

The channel separation part 302 includes a first symbol delay 302a for delaying the modulated signal which is input from the bandpass filter 301 by one symbol, a first mix part 302c for mixing the one-symbol delayed signal and the modulated signal of the bandpass filter 301 to derive a signal of Q channel, a phase shift keying part 302b for shifting the one-symbol delayed signal by π/2 phase, and a second mix part 302d for mixing the modulated signal of which phase is shifted by the phase shift keying part 302b and the modulated signal of the bandpass filter 301 to derive a signal of I channel.

Figure 4:
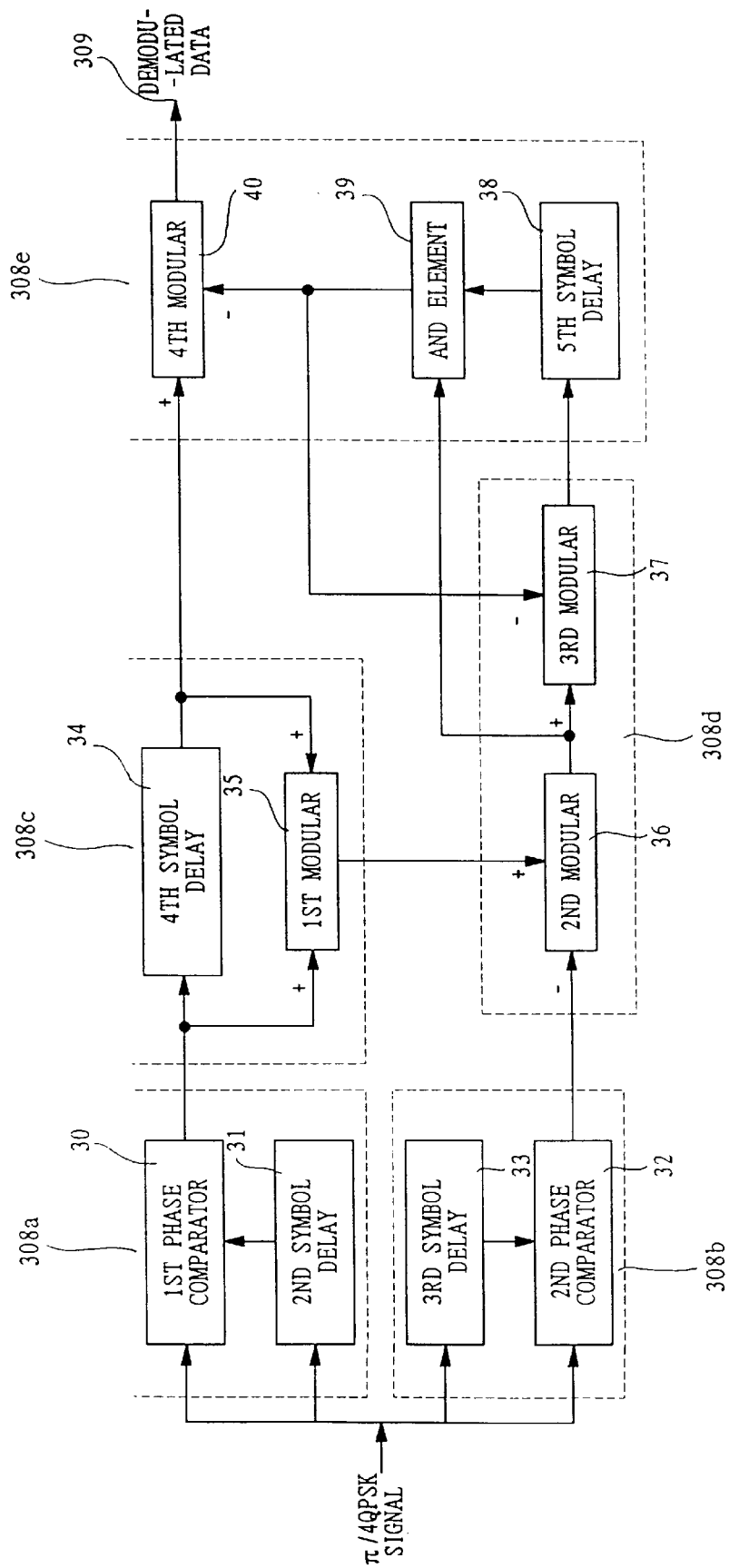
FIG. 4 is a schematic block diagram showing an error correction part of FIG. 3 in more detail.

FIG. 4 illustrates a preferred embodiment of an error correction part 308 of FIG. 3 in more detail. In FIG. 4, the error correction part 308 includes a first phase information detection part 308a for obtaining a phase difference by comparing the output data from the parallel/serial conversion part 307 with a first symbol delayed previous data from a second symbol delay 31 by means of a first phase comparator 30, a second phase information detection part 308b for obtaining a phase difference by comparing a current output data from the parallel/serial conversion part 307 and a two-symbol delayed previous data by means of a second phase comparator 32, a first operation part 308c for operating with 8 module values a current phase information and the phase information obtained by the first phase information detection part 308a after delaying it by a predetermined symbol unit by means of a fourth symbol delay 34 so as to recover basic data, a second operation part 308d for sequentially operating the phase information obtained by the second phase information detection part 308b and the operation value of the first operation part 308c with 8 module values to recover parity data, and a data recovery output part 308e for correcting error on the basis of the data which is recovered by the first and the second operation parts 308c and 308d.

The data recovery output part 308e includes a fifth symbol delay 38 for delaying data which is operated by a third modular 37 by one symbol, an AND element 39 for performing AND of current data which is operated by a second modular 36 with a previous data which is obtained by the fifth symbol delay 38 to be feedback output to the third modular 37, and a fourth modular 40 for operating data which is multiplied by the AND element 39 and a data which is delayed by one symbol by the second symbol delay 34 of the first operation part 308c with 8 module values to output the operated value from an output terminal 309 thereof.

Now, the π/4 QPSK digital demodulation apparatus according to a preferred embodiment of the present invention is described in more detail in its operation.

The QPSK modulated signal which is input by the receiving input terminal 300 is past through the bandpass filter 301 and provided to the channel separation part 302 after removing unnecessary signals.

The channel separation part 302 includes the first symbol delay 302a, the first and the second mix parts 302c and 302d and the phase shift keying part 302b, and mixes the modulated input signals which is filtered and the one-symbol delayed previous modulated signal for separating the Q channel signal and the I channel signal to be respectively provided to the first and the second low-pass filter parts 303 and 304.

In the channel separation part 302, the QPSK modulated signal is input to the first mix part 302c and shifted by π/2 phase at the phase shift keying part 302b to be input to the second mix part 302d after being delayed by one-symbol through the first symbol delay 302a.

Therefore, the first mix part 302c mixes the modulated signal which is delayed by one-symbol at the first symbol delay 302a and the current modulated signal which is input from the bandpass filter 301 to derive the Q channel signal, while the second mix part 302d mixes the modulated signal of which phase is shifted by π/2 phase at the phase shift keying part 302b and the modulated signal which is input from the bandpass filter 301 to derive the I channel signal.

When the Q and I channel signals, that is signals of an orthogonal component Q and a cophase component I are respectively provided to the first and the second low-pass filters 303 and 304, the first and the second low-pass filters 303 and 304 cut of carrier components of the first and the second mix parts 302c and 302d to derive only the orthogonal and cophase components, that the baseband signals of the Q and I channels.

The baseband signals of the Q and I signals are respectively sampled at the first and the second sampling parts 305a and 306a of the first and the second data recovery parts 305 and 306, and then input to the parallel/serial conversion part 307 after respectively being decided at the first and the second decision parts 305b and 306b. Therefore, the parallel/serial conversion part 307 converts parallel data of the input Q and I channels into serial one and outputs the converted data to the error correction part 308.

The error correction part 308 obtains two or three phase difference informations on the basis of the current converted serial data and previous data to operate the obtained phase differences by delaying and decides a threshold value of the delay operated error value, thereby correcting two errors.

Now, referring to FIG. 4, the operation of the error correction part 308 according to a preferred embodiment of the present invention will be described in more detail.

The serial data converted by the parallel/serial conversion part 307 are respectively one-symbol and two-symbol delayed by the second and the third symbol delay 31 and 33 of the first and the second phase information detection parts 308a and 308b and respectively input to the first and the second phase comparators 30 and 32.

The first phase comparator 30 compares the current serial data with the one-symbol delayed data to obtain a phase difference information, while the second phase comparator 32 compares the current serial data with the two-symbol delayed data to obtain a phase difference information. The phase difference information which is obtained by the first phase difference detection part 308a is delayed by one-symbol at the fourth symbol delay 34 of the first operation part 308c and provided to the first modular 35 and the fourth modular 40 of the data recovery output part 308e.

The first modular 35 operates the current phase difference information which is input from the first phase comparator 30 and the previous phase difference information which is one-symbol delayed at the fourth symbol delay 34 with 8 modules and provides the operation value to the second modular 36 of the second operation part 308d to which the phase difference information of the second phase comparator 32 is provided.

Therefore, the second modular 36 of the second operation part 308d operates the phase difference information which is obtained by the first modular 35 and the phase difference information which is obtained by the second phase comparator 32 with 8 modules and provides the operation value to the third modular 37 and the AND element 39 of the data recovery output part 308e.

The third modular 37 operates a output value of the AND element 39 and the operation value of the second modular 36 with 8 modules and provides the operation value to the fifth delay 38 of the data recovery output part 308e which delays the phase information operated at the third modular 37 to provide to the AND element 39.

Therefore, the AND element 39 performs AND operation with the phase difference information which is obtained by the second modular 36 and the previous phase difference information which is delayed by one-symbol at the fifth symbol delay 38 and the AND operation value is feedback output to the third modular 37 and the fourth modular 40.

The fourth modular 40 operates the phase data which is output from the fourth symbol delay 34 of the first operation part 308c and the parity data which has data correlation through the AND element 39 with 8 modules to output demodulated data through the output terminal 309.

Figure 5:
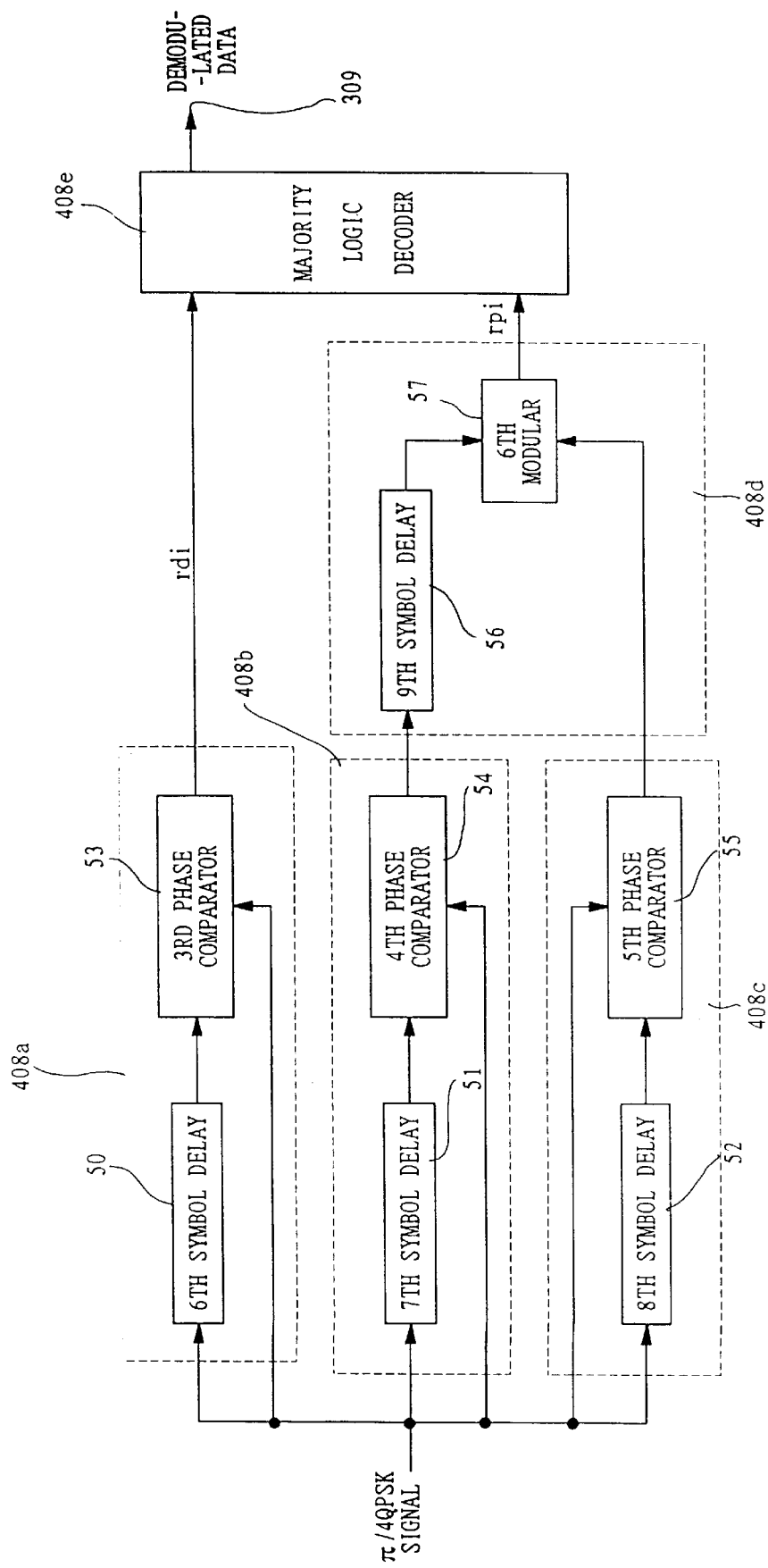
FIG. 5 is a schematic block diagram showing an error correction part according to another preferred embodiment of the present invention.

FIG. 5 is a block diagram showing another error correction part 308 according to another preferred embodiment of the present invention. In FIG. 5, the error correction part 308 includes a third phase information detection part 408a for obtaining phase difference information by comparing the output data from the parallel/serial conversion part 307 and a previous data which is one-symbol delayed by the sixth symbol delay 50 by means of the third phase comparator 53, a fourth phase information detection part 408b for obtaining a phase difference information by comparing a current output data which is output from the parallel/serial conversion part 307 and a previous data which is two-symbol delayed by a seventh symbol delay 51 by means of a fourth phase comparator 54, a fifth phase information detection part 408c for obtaining a phase difference information by comparing a current data which is output from the parallel/serial conversion part 307 and a previous data which is six-symbol delayed by an eighth symbol delay 52 by means of a fifth phase comparator 55, a third operation part 408d for operating a current phase information obtained by the fifth phase information detection part 408c and the phase information obtained by the fourth phase information detection part 408b with 8 modules at a sixth modular 57 after delaying by one-symbol at a ninth symbol delay 56 so as to recover parity data, and a majority-logic decoder 408e for sequentially operating the operation value of the third operation part 408d and the phase information obtained by the third phase information detection part 408a with 8 module values after delaying the phase information of the third phase information detection part 408e by steps to decide a threshold value of an error, thereby providing data of which errors are recovered.

Figure 6:
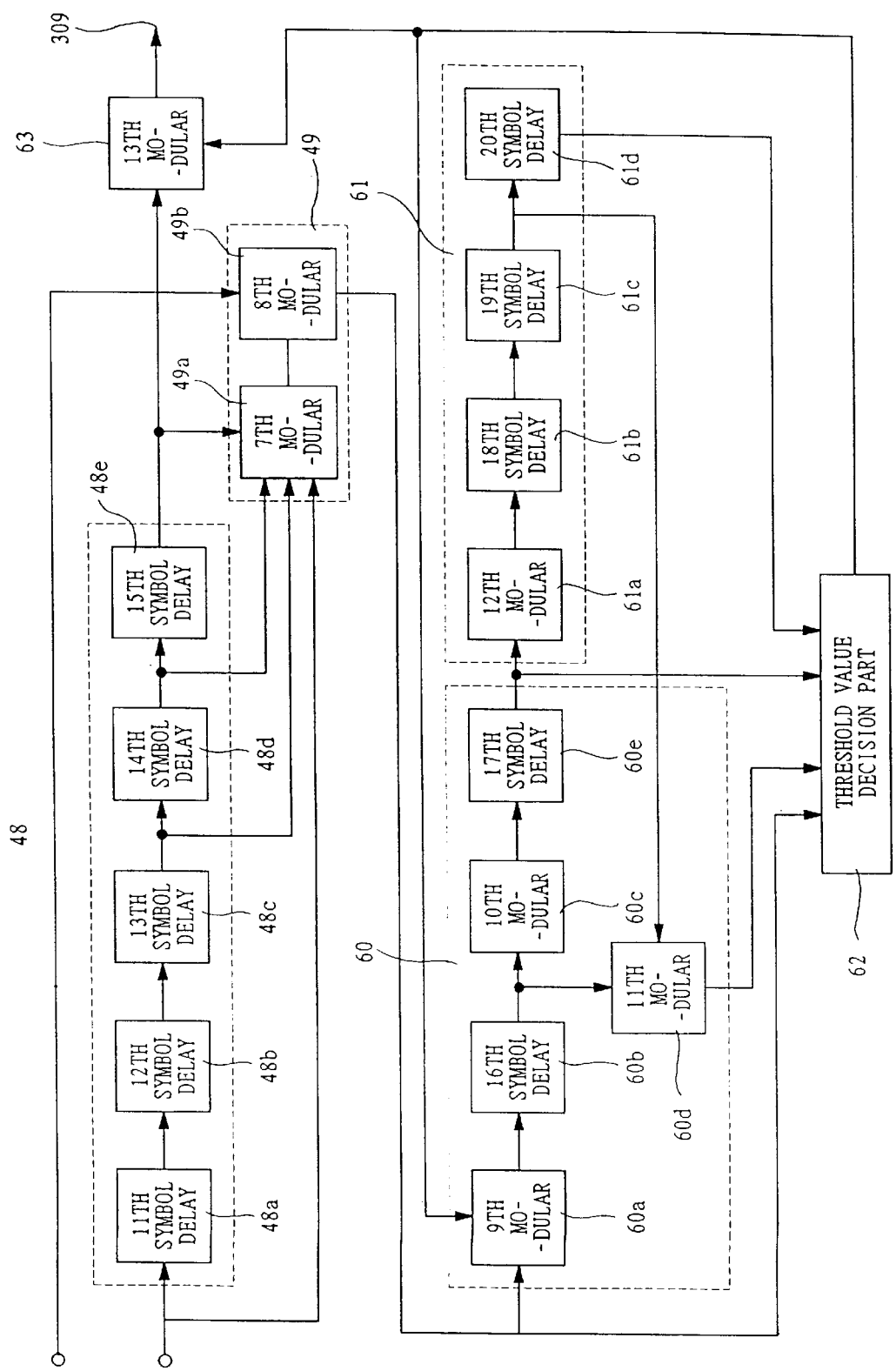
FIG. 6 is a schematic block diagram showing majority-logic decoder of FIG. 5 in more detail.

FIG. 6 illustrates of the majority-logic decoder 408e according to an embodiment of the present invention.

In FIG. 6, the majority-logic decoder 408e includes a delay part 48 for delaying the phase difference information obtained by the third phase information detection part 408a by 5-symbol through an eleventh symbol delay 48a to a fifteenth symbol delay 48e, a fourth operation part 49 for operating phase difference information respectively delayed by 3-symbol, 4-symbol, and 5-symbol at the delay part 48 and a current phase difference information which is obtained by the third phase information detection part 408a with 8 module values through a seventh modular 49a and an eighth modular 49b to detect an error, a fifth operation part 60 for sequentially operating the error value obtained by the fourth operation part 49 and a feedback error value with 8 module values at the eleventh modulars 60a, 60c, and 60d to output after delaying the operated values by 2-symbol through an sixteenth delay 60b and a seventeenth delay 60e, a sixth operation part 61 for operating the previous error value which is delayed 2-symbol by the fifth operation part 60 and a feedback error value with 8 module values at a twelfth modular 61a to output after delaying the operated value by three-symbol through an eighteenth symbol delay 61b to a twentieth symbol delay 61d, a threshold value decision part 62 for deciding threshold values of the error value obtained by the fifth and the sixth operation parts 60 and 61 and the threshold value of the error value of one bit which is input from the third operation part 49 to output the threshold values to the fifth and the sixth operation parts 60 and 61, and a thirteenth modular 63 for operating the error values decided by the threshold value decision part 62 and the phase difference information obtained by the delay part 48 with 8 module values to output demodulated data.

Now, the operation of the error correction part 308 according to another preferred embodiment of the present invention will be described in more detail.

The serial data which is converted by the parallel/serial conversion part 307 is delayed by one-symbol, two-symbol and six-symbol respectively by the sixth to the eighth symbol delays 50 to 52 of the third to the fifth phase information detection parts 408a to 408c, and provided to the third to the fifth phase comparators 53 to 55.

The third phase comparator 53 compares the current serial data with the one-symbol delayed data for obtaining phase difference information, the fourth phase comparator 54 compares the current serial data with the two-symbol delayed data for obtaining phase difference information, and the fifth phase comparator 55 compares the current serial data with the six-symbol delayed data for obtaining phase difference information.

The phase difference information which is obtained by the third phase information detection part 408a is provided to the majority-logic decoder 408e, and the phase difference information which is obtained by the fourth phase information detection part 408b is provided to the ninth symbol delay 56 of the third operation part 408d, wherein the phase difference information of the fourth phase information detection part 408b is one-symbol delayed and operated with the phase difference information of the fifth phase information detection part 408a by 8 module values to be provided to the majority-logic decoder 408e.

Therefore, the majority-logic decoder 408e delays the phase information of the third phase information detection part 408a by steps and sequentially operates the delayed value and the operation value of the third operation part 408d with 8 module values to decide a threshold value of an error, thereby providing data of which error is recovered.

The majority-logic decoder 408e, as shown in FIG. 6, includes a demodulation data output part such as the delay part 48, the fourth to sixth operation parts 49 to 61, a threshold value decision part 62 and a thirteenth modular 63, wherein the delay part 48 delays the phase difference information obtained by the third phase information detection part 408a by 5-symbol through the eleventh symbol delay 48a to the fifteenth symbol delay 48e and provides this 5-symbol delayed phase difference information to the thirteenth modular 63 as well as and the 3-symbol and 4-symbol delayed phase difference information to the seventh modular 49a of the fourth operation part 49.

The fourth operation part 49 operates the phase difference information respectively delayed by 3-symbol, 4-symbol, and 5-symbol at the delay part 48 and a current phase difference information which is obtained by the third phase information detection part 408a with 8 module values and provide the operated error value to the eighth modular 39b.

The eighth modular 49b operates the error value obtained by the seventh modular 49a and the error value obtained by the third operation part 408d with 8 module values and provides the operated value to the fifth operation part 60 and the threshold value decision part 62.

The tenth modular 60c operates the error value which is feedback input from the threshold value decision part 62 and the error value which past through the sixteenth symbol delay 60b, wherein the operation error value is delayed by the seventeenth symbol delay 60e and provided to the threshold value decision part 62 and the sixth operation part 61.

The error value input to the sixth operation part 61 is operated with the error value which is feedback input from the threshold value decision part 62 by 8 module values at the twelfth modular 61*a* and delayed through the eighteenth to the twentieth symbol delays 61*b* to 61*d* to be provided to the threshold value decision part 62.

On the other hand, the eleventh modular 60*d* of the fifth operation part 60 operates the error value which is delayed by two-symbol at the sixth operation part 61 and the error value which is delayed at the sixteenth symbol delay 60*b* with 8 module values to output to the threshold value decision part 62.

Then, the threshold value decision part 62 decides the input from the eleventh modular 60*d* to be n and provides this error data to the thirteenth modular 63, if the three or four inputs from the fourth to the sixth operation parts 49 to 61 are simultaneously to be n.

Figure 7:
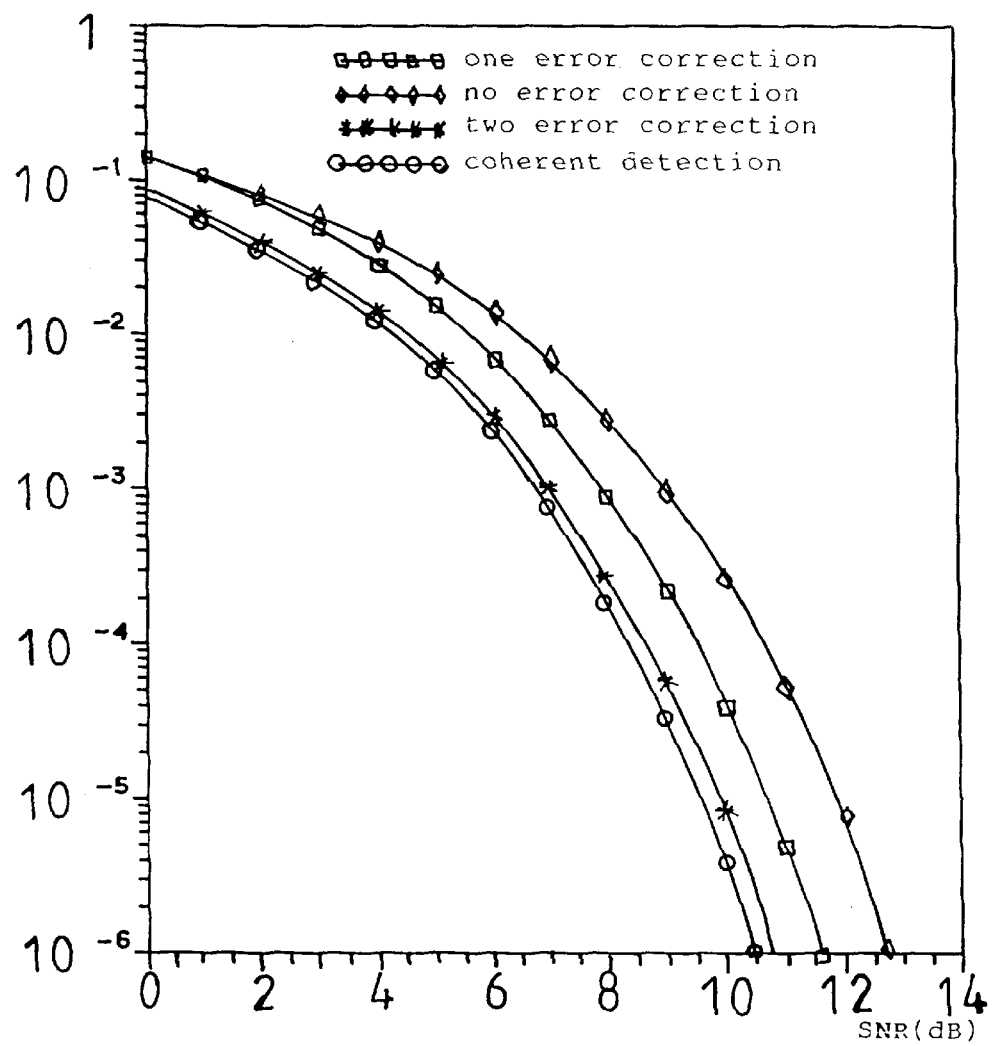
FIG. 7 is a graph showing error correction operation by adapting formula of FIG. 3.

The thirteenth modular 63 deducts the phase difference information which is delayed at the delay part 48 and the error value which is decided at the threshold value decision part 62 with 8 modules, so that demodulated data of which error data is corrected as shown in FIG. 7 is output through the output terminal 309.

Figure 8:
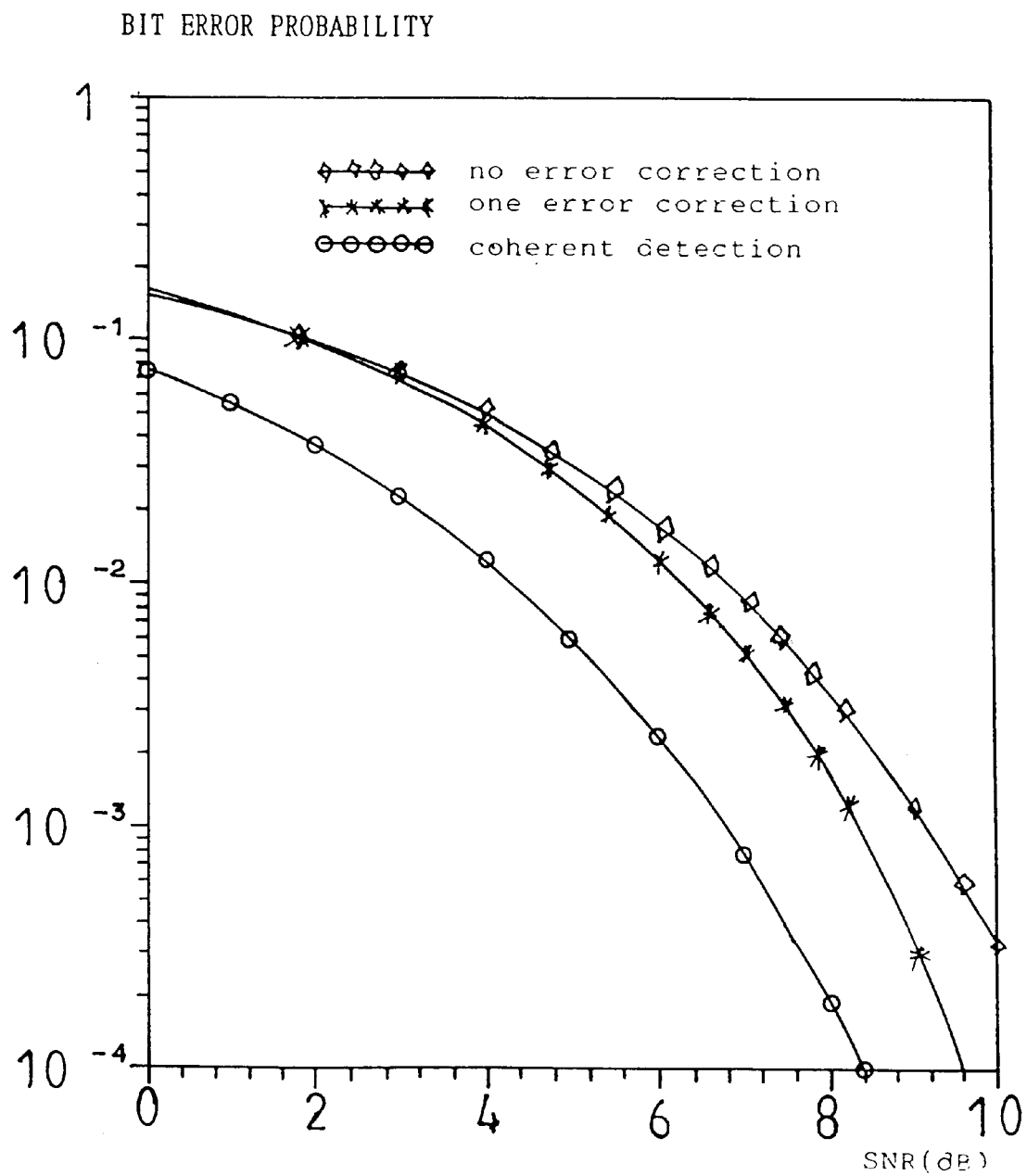
FIG. 8 is a graph showing a state that errors are corrected of FIG. 3.

FIG. 7 is a graph showing an error corrected state by adapting formulae of FIG. 3, and FIG. 8 is a graph showing an error corrected state in real by inputting data values of FIG. 3.

With comparing to the conventional technique wherein a clock recovery part is required for recovering errors of a symbol rate clock being in use at a transmitter and an error correction circuit is added to correct errors of modulated signals by using complicated Hamming Code and BCH code, according to the present invention, the errors may be simply corrected by just connecting a simple demodulation circuit of hardware at a rear part of the differential detection part. Therefore, it may be appreciated that the present invention may achieve the same or greater effect of error correction while simplifying the construction of the π/4 QPSK demodulation apparatus.

Effect of the Invention

According to the present invention, the π/4 QPSK demodulation apparatus may correct error data by utilizing parity characteristics with differential detection of simple circuit arrangement which is stable and good at fading phenomenon, without any additional correction circuits.

What is claimed is:

1. A π/4 QPSK digital modulation method of a digital demodulation apparatus of a QPSK receiver which demodulates an input signal being modulated in QPSK method by separating into an I (In Phase) channel signal and a Q (Quadrature) channel signal by a local carrier which is synchronized with the transmitter, comprising the steps of:

mixing the input modulated signal with one-symbol delayed reference signal to derive phase information of the I channel signal and the Q channel signal;

recovering data by sampling the phase information of the derived I channel and the Q channel;

converting the recovered I and Q channel data to serial data to recover parity data and basic data on the basis of the converted serial data and previous data which is delayed by a predetermined symbol unit; and correcting errors of the recovered basic information data and the parity data by a predetermined modular operation.

2. The π/4 QPSK digital modulation method according to claim 1, wherein the data recovering step comprises the sub-steps of:

comparing the converted serial data with a previous data which is one symbol-delayed; and comparing the converted serial data with a previous data which is two symbol-delayed.

3. The π/4 QPSK digital modulation method according to claim 1 wherein the data recovering step further comprises the sub-step of comparing phase difference between the converted serial data and a previous data which is six-symbol delayed to recover parity data.

4. The π/4 QPSK digital modulation method according to claim 1, wherein the error correcting step comprises the sub-steps of:

recovering parity data having correlation between data on the basis of data which is delayed by units of a second symbol and a third symbol;

delaying the recovered basic information data and the parity data by units of symbols to decide a delayed value; and modular operating the decided threshold error value to correct data error.

5. The π/4 QPSK digital modulation method according to claim 4, wherein the second symbol and the third symbol are respectively to be two-symbol and six-symbol.

6. The π/4 QPSK digital modulation method according to claim 1, wherein the delayed predetermined symbol unit is to be one-symbol.

7. The π/4 QPSK digital modulation method according to claim 1, wherein a predetermined modular value is to be 8.

8. A π/4 QPSK digital demodulation apparatus wherein a signal of which digital data is modulated by QPSK is separated into I and Q channel signals by a local carrier which is synchronized with a transmitter and the separated I and Q channel signals pass through respectively low-pass filters for being converted to the digital signals to be demodulated, comprising:

a bandpass filter part to remove unnecessary signals from input QPSK modulated signals;

a channel separation part for mixing the modulated signals input from the bandpass filter and a one-symbol delayed modulated previous signal to separate a Q channel signal and an I channel signal;

a first low-pass filter part and a second low-pass filter part for cutting off carrier component from the Q and I channel signals which are separated by the channel separation part to derive baseband signals of orthogonal component and cophase component;

a first data recovery part and a second data recovery part respectively for sampling the baseband signals of the Q and I channels respectively input from the first and the second low-pass filter parts to decide and recover the data;

a parallel/serial conversion part for converting the two recovered data into serial data; and an error correction part for obtaining phase differences on the basis of the converted serial data and previous data and operating the phase differences with a predetermined module value, thereby providing data of which error is recovered.

9. A π/4 QPSK digital demodulation apparatus according to claim 8, wherein the channel separation part comprises:

a first symbol delay for delaying the modulated signal which is input from the bandpass filter by one symbol;

a first mix part for mixing the one-symbol delayed signal and the modulated signal of the bandpass filter to derive a signal of Q channel;

a phase shift keying part for shifting the one-symbol delayed signal by $\pi/2$ phase; and a second mix part for mixing the modulated signal of which phase is shifted by the phase shift keying part and the modulated signal of the bandpass filter to derive a signal of I channel.

10. A $\pi/4$ QPSK digital demodulation apparatus according to claim 8, wherein the first data recovery parts comprises a first sampling part for sampling the baseband signal of the Q channel which is filtered by the first low-pass filter and a first decision part for deciding the sampled data, and the second data recovery part includes a second sampling part for sampling the baseband signal of the Q channel which is filtered by the second low-pass filter and a second decision part for deciding the sampled data.

11. A $\pi/4$ QPSK digital demodulation apparatus according to claim 8, wherein the error correction part comprises:

a first phase information detection part for obtaining a phase difference on the basis of the output data from the parallel/serial conversion part and a one-symbol delayed previous data;

a second phase information detection part for obtaining a phase difference on the basis of a current output data from the parallel/serial conversion part and a two-symbol delayed previous data;

a first operation part for operating with a predetermined module value a current phase information and the phase information obtained by the first phase information detection part after delaying by a predetermined symbol so as to recover basic data;

a second operation part for sequentially operating the phase information obtained by the second phase information detection part and the operation value of the first operation part with a predetermined module value to recover parity data; and a data recovery output part for correcting error on the basis of the data which is recovered by the first and the second operation parts.

12. A $\pi/4$ QPSK digital demodulation apparatus according to claim 11, wherein the first phase information detection part comprises a second symbol delay for delaying output data from the parallel/serial conversion by a predetermined symbol, and a first phase comparator for comparing the current serial data which is obtained by the parallel/serial conversion part with a previous data which is obtained by the second symbol delay to obtain a phase difference information.

13. A $\pi/4$ QPSK digital demodulation apparatus according to claim 11, wherein the second phase information detection part comprises a third delay for delaying the output data from the parallel/serial conversion part by a predetermined symbol, and a second phase comparator for comparing the current serial data which is obtained by the parallel/serial conversion part with the previous data which is obtained by the third symbol delay to obtain a phase difference information.

14. A $\pi/4$ QPSK digital demodulation apparatus according to claim 11, wherein the first operation part comprises a fourth symbol delay for delaying the phase difference information which is obtained by the first phase difference detection part by one-symbol and a first modular for operating the current phase difference information which is input from the first phase comparator and the previous phase difference information which is one-symbol delayed at the fourth symbol delay with a predetermined module value.

15. A $\pi/4$ QPSK digital demodulation apparatus according to claim 11, wherein the data recovery output part comprises:

a fifth symbol delay for delaying data which is operated by a second operator by one symbol;

an AND element for performing AND operation of current data which is operated by a second modular with a previous data which is obtained by the fifth symbol delay to output; and a fourth modular for operating data which is multiplied by the AND element and a previous data which is delayed by one symbol by the first operation part with a predetermined module value.

16. A $\pi/4$ QPSK digital demodulation apparatus according to claim 11, wherein the second operation part comprises:

the second modular for operating the phase difference information which is obtained by the second phase information detection part and the data which is obtained by the first operation part with a predetermined module value, and provides the operation value to the third modular and the AND element of the data recovery output part; and a third modular for operating an output value of the AND element and the operation value of the second modular with a predetermined module value to provide the operation value to the data recovery output part.

17. A $\pi/4$ QPSK digital demodulation apparatus according to claim 11, wherein the first symbol is to be one-symbol.

18. A $\pi/4$ QPSK digital demodulation apparatus according to claim 11, wherein the second symbol is to be two-symbol.

19. A $\pi/4$ QPSK digital demodulation apparatus according to claim 8, wherein the error correction part comprising:

a third phase information detection part for obtaining phase difference information on the basis of the output data from the parallel/serial conversion part and previous data delayed with a first symbol;

a fourth phase information detection part for obtaining phase difference information on the basis of a current output data from the parallel/serial conversion part and previous data delayed with a second symbol;

a fifth phase information detection part for obtaining phase difference information on the basis of a current output data from the parallel/serial conversion part and previous data delayed with a third symbol;

a third operation part for operating a current phase information obtained by the fifth phase information detection part and the phase information obtained by the fourth phase information detection part after delaying with a predetermined symbol so as to recover parity data; and a majority-logic decoder for sequentially operating the operation value of the third operating part and the phase information obtained by the third phase information detection part after delaying it by steps with a predetermined module value to decide a threshold value of an error, thereby providing data of which errors are recovered.

20. A $\pi/4$ QPSK digital demodulation apparatus according to claim 19, wherein the third phase information detection part comprises:

a sixth symbol delay for delaying the converted serial data with one-symbol; and a third phase comparator for comparing the one-symbol delayed data and the converted current serial data to obtain a phase difference.

21. A $\pi/4$ QPSK digital demodulation apparatus according to claim 19, wherein the fourth phase detection part comprises:

a seventh symbol delay for delaying the converted serial data with two symbols; and a fourth phase comparator for comparing the two symbol delayed data with the current serial data to obtain a phase difference.

22. A π/4 QPSK digital demodulation apparatus according to claim 19, wherein the fifth phase information detection part comprises:

an eighth symbol delay for delaying the converted serial data with six symbols; and a fifth phase comparator for comparing the six-symbol delayed data with the current serial data to obtain a phase difference.

23. A π/4 QPSK digital demodulation apparatus according to claim 19, wherein the third operation part comprises:

a ninth symbol delay for delaying the phase difference information which is detected by the fourth phase information detection part with one symbol; and a sixth modular for operating the one-symbol delayed phase difference data and the phase information which is detected by the fifth phase information detection part with 8 module values.

24. A π/4 QPSK digital demodulation apparatus according to claim 19, wherein the majority-logic decoder comprises:

a delay part for delaying the phase difference information obtained by the third phase information detection part by five symbols;

a fourth operation part for operating phase difference information respectively delayed by three symbols, four symbols, and five symbols and a current phase difference information obtained by the third phase information detection part with 8 module values to detect an error;

a fifth operation part for sequentially operating the error value obtained by the fourth operation part and a feedback error value with 8 module values to output after delaying it by two symbols;

a sixth operation part for operating the previous error value which is delayed with two symbols by the fifth operation part and a feedback error value with 8 module values to output after delaying;

a threshold value decision part for deciding threshold values of the error values obtained by the fifth and the sixth operation parts and the error value input from the fourth operation part to feedback output the threshold values to the fifth and the sixth operation parts; and a demodulation data output part for operating the error values decided by the threshold value decision part and the phase difference information obtained by the delay part with 8 values to output demodulated data.

25. A π/4 QPSK digital demodulation apparatus according to claim 8, wherein the predetermined module value is to be 8.

26. The π/4 QPSK digital modulation method according to claim 2, wherein the data recovering step further comprises the sub-step of comparing phase difference between the converted serial data and a previous data which is six-symbol delayed to recover parity data.

27. A π/4 QPSK digital demodulation apparatus according to claim 15, wherein the second operation part comprises:

the second modular for operating the phase difference information which is obtained by the second phase information detection part and the data which is obtained by the first operation part with a predetermined module value, and provides the operation value to the third modular and the AND element of the data recovery output part; and a third modular for operating an output value of the AND element and the operation value of the second modular with a predetermined module value to provide the operation value to the data recovery output part.

* * * * *